(12) United States Patent
Yu et al.

(10) Patent No.: US 12,482,890 B2
(45) Date of Patent: Nov. 25, 2025

(54) BATTERY MODULE CAPABLE OF PREVENTING MOVEMENT OF GAS TO ADJACENT MODULE

(71) Applicant: LG ENERGY SOLUTION, LTD., Seoul (KR)

(72) Inventors: Sang Hyun Yu, Daejeon (KR); Dae Hoon Lim, Daejeon (KR); Young Seok Lee, Daejeon (KR); Jin Kyu Shin, Daejeon (KR); Kyung Hyun Bae, Daejeon (KR); Young Bin Im, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 745 days.

(21) Appl. No.: 17/627,338

(22) PCT Filed: Sep. 28, 2020

(86) PCT No.: PCT/KR2020/013240
§ 371 (c)(1),
(2) Date: Jan. 14, 2022

(87) PCT Pub. No.: WO2021/118028
PCT Pub. Date: Jun. 17, 2021

(65) Prior Publication Data
US 2022/0263174 A1  Aug. 18, 2022

(30) Foreign Application Priority Data

Dec. 12, 2019 (KR) .................... 10-2019-0165836

(51) Int. Cl.
*H01M 50/24* (2021.01)
*H01M 50/211* (2021.01)
(Continued)

(52) U.S. Cl.
CPC ......... *H01M 50/24* (2021.01); *H01M 50/211* (2021.01); *H01M 50/276* (2021.01); *H01M 50/503* (2021.01)

(58) Field of Classification Search
None
See application file for complete search history.

(56) References Cited

U.S. PATENT DOCUMENTS

| 2012/0103714 A1 | 5/2012 | Choi et al. |
| 2013/0241493 A1 | 9/2013 | Kosaki et al. |

(Continued)

FOREIGN PATENT DOCUMENTS

| CN | 102468454 A | 8/2012 |
| CN | 103088808 A | 4/2013 |

(Continued)

OTHER PUBLICATIONS

Machine translation JP2009146797A (Year: 2024).*

(Continued)

*Primary Examiner* — Brian R Ohara
*Assistant Examiner* — M. T. Leonard
(74) *Attorney, Agent, or Firm* — Birch, Stewart, Kolasch & Birch, LLP (57) ABSTRACT

A battery module prevents the movement of gas to an adjacent module, and more particularly a battery module capable of preventing the movement of gas to an adjacent module, the battery module including a module case and a unit module, wherein the module case is made of an insulative material, two or more unit modules are received in the module case, the two or more unit modules are located spaced apart from each other by a predetermined distance, and each of the unit modules includes one or more battery cells stacked in a vertical direction.

15 Claims, 9 Drawing Sheets

(51) Int. Cl.
*H01M 50/276* (2021.01)
*H01M 50/503* (2021.01)

(56) References Cited

U.S. PATENT DOCUMENTS

| | | | |
|---|---|---|---|
| 2014/0242429 A1 | 8/2014 | Lee et al. | |
| 2014/0353057 A1 | 12/2014 | Adachi | |
| 2015/0280190 A1 | 10/2015 | Ohshiba et al. | |
| 2016/0028058 A1 | 1/2016 | Lee et al. | |
| 2018/0026243 A1 | 1/2018 | Stojanovic et al. | |
| 2018/0114960 A1* | 4/2018 | Sato | H01M 50/209 |
| 2018/0194235 A1 | 7/2018 | Kim et al. | |
| 2018/0212292 A1* | 7/2018 | Maguire | H01M 50/227 |
| 2018/0219198 A1* | 8/2018 | Pflueger | H01M 10/6556 |
| 2019/0181405 A1 | 6/2019 | Kim et al. | |
| 2019/0334141 A1* | 10/2019 | Kwon | H01M 10/6563 |
| 2020/0189400 A1 | 6/2020 | Kim et al. | |
| 2020/0194851 A1 | 6/2020 | Seo et al. | |
| 2021/0167445 A1 | 6/2021 | Becker et al. | |

FOREIGN PATENT DOCUMENTS

| | | | | |
|---|---|---|---|---|
| CN | 108348843 A | 7/2018 | | |
| CN | 208385481 U | 1/2019 | | |
| EP | 3 675 274 A1 | 7/2020 | | |
| FR | 3 062 521 A1 | 8/2018 | | |
| JP | 2008-91205 A | 4/2008 | | |
| JP | 2009-146797 A | 7/2009 | | |
| JP | 2011-165477 A | 8/2011 | | |
| JP | 2012-54052 A | 3/2012 | | |
| JP | 2012-104225 A | 5/2012 | | |
| JP | 2014154245 A | * | 8/2014 | H01M 2/1077 |
| JP | 2015-62153 A | 4/2015 | | |
| JP | 2015-195136 A | 11/2015 | | |
| JP | 2016-509747 A | 3/2016 | | |
| JP | 2018-32468 A | 3/2018 | | |
| JP | 2018-129240 A | 8/2018 | | |
| JP | 2018-500736 A | 1/2019 | | |
| JP | 2019-53816 A | 4/2019 | | |
| KR | 10-2009-0002428 A | 1/2009 | | |
| KR | 10-2013-0086677 A | 8/2013 | | |
| KR | 10-2015-0129991 A | 11/2015 | | |
| KR | 10-2016-0081015 A | 7/2016 | | |
| KR | 10-2018-0010989 A | 1/2018 | | |
| KR | 10-2019-0069873 A | 6/2019 | | |
| KR | 10-2019-0072093 A | 6/2019 | | |
| KR | 10-2019-0110782 A | 10/2019 | | |
| WO | WO 2013/129117 A1 | 9/2013 | | |

OTHER PUBLICATIONS

Machine translation JP2014154245A (Year: 2024).*
International Search Report (PCT/ISA/210) issued in PCT/KR2020/013240, dated Jan. 11, 2021.
Extended European Search Report for European Application No. 20899551.4, dated Jul. 6, 2022.
European Communication pursuant to Article 94(3) EPC for European Application No. 20 899 551.4, dated May 19, 2025.

* cited by examiner

BATTERY MODULE CAPABLE OF PREVENTING MOVEMENT OF GAS TO ADJACENT MODULE

TECHNICAL FIELD

This application claims the benefit of priority to Korean Patent Application No. 2019-0165836 filed on Dec. 12, 2019, the disclosure of which is hereby incorporated by reference herein its entirety.

The present invention relates to a battery module capable of preventing the movement of gas to an adjacent module, and more particularly to a battery module capable of preventing the movement of gas to an adjacent module, wherein a plurality of modules is separated from each other, and a plurality of holes is formed in a cover, whereby gas generated in the battery module is easily discharged to the outside.

BACKGROUND ART

With technological development of mobile devices, such as mobile phones, laptop computers, camcorders, and digital cameras, and an increase in demand therefor, research on secondary batteries, which are capable of being charged and discharged, has been actively conducted. In addition, secondary batteries, which are energy sources substituting for fossil fuels causing air pollution, have been applied to an electric vehicle (EV), a hybrid electric vehicle (HEV), and a plug-in hybrid electric vehicle (P-HEV), and therefore there is an increasing necessity for development of secondary batteries.

There are a nickel-cadmium battery, a nickel-hydride battery, a nickel-zinc battery, and a lithium secondary battery as currently commercialized secondary batteries. Thereamong, the lithium secondary battery is in the spotlight, since the lithium secondary battery has little memory effect, whereby the lithium secondary battery is capable of being freely charged and discharged, has a very low self-discharge rate, and has high energy density, compared to the nickel-based secondary batteries.

Meanwhile, in the case in which the above secondary battery is used in a device that requires large capacity and high voltage, such as an electric vehicle, the secondary battery is used in the form of a battery module or a battery pack having a structure in which a plurality of battery cells is arranged.

When thermal runaway occurs in a specific battery cell due to short circuit, thermal impact, or electrical breakdown, however, high-temperature gas is generated in the battery cell, and the generated gas causes deformation of or damage to unit cells adjacent thereto or the battery module.

In connection therewith, Korean Patent Application Publication No. 2013-0086677 discloses a battery pack including a battery module array constituted by one or more battery modules, each of which includes one or more unit modules, each of which has a structure in which a battery cell is wrapped by a cell cover, are mounted in a module case in the state in which the unit modules are stacked while being erected vertically, a base plate on which the battery module array is mounted, a pair of end plates configured to support opposite side surfaces of the battery module array in the state in which the lower ends of the end plates are fixed to the base plate, and an insulative member interposed between the battery module array and each of the end plates, the insulative member being provided at the surface thereof that faces the battery module array with one or more ribs configured to perform a shock absorption function with respect to external force and to form a refrigerant channel.

In Korean Patent Application Publication No. 2013-0086677, the shock absorption function is performed and the refrigerant channel is formed using the end plates, whereby safety of the battery pack is supplemented. Since the battery cells are in tight contact with each other, however, there is still a problem in that, when short circuit, thermal impact, or electrical breakdown occurs in a specific battery cell, high-temperature gas is accumulated in the battery cell, which affects battery cells adjacent thereto, whereby thermal runaway occurs.

PRIOR ART DOCUMENT (Patent Document 1) Korean Patent Application Publication No. 2013-0086677

DISCLOSURE

Technical Problem

The present invention has been made in view of the above problems, and it is an object of the present invention to provide a battery module capable of preventing the movement of gas to an adjacent module, the battery module having a structure capable of minimizing the effect of heat or gas generated when thermal runaway occurs on the adjacent module.

It is another object of the present invention to provide a battery module capable of preventing the movement of gas to an adjacent module, the battery module having a structure capable of minimizing the number of fastening members while being simply assembled.

Technical Solution

In order to accomplish the above objects, a battery module capable of preventing the movement of gas to an adjacent module according to the present invention includes a module case (100) and a plurality of unit modules (200), wherein the module case (100) is made of an insulative material, two or more unit modules of the plurality of unit modules (200) are received in the module case, the two or more unit modules (200) are located spaced apart from each other by a predetermined distance, and each of the plurality of unit modules (200) includes one or more battery cells (230) stacked in a vertical direction.

Also, in the battery module according to the present invention, the module case (100) may include an upper housing (110), a lower housing (120), a front cover (130), and a rear cover (140).

Also, in the battery module according to the present invention, the rear cover (140) may be provided with a bent portion (141) formed so as to project outwards, and a plurality of holes (142) may be formed in the bent portion (141).

Also, in the battery module according to the present invention, each of the unit modules (200) may include an upper cover (210), a lower cover (220), a plurality of battery cells (230) received in a space portion defined by the upper cover (210) and the lower cover (220), a front busbar assembly (240), a rear busbar assembly (250), a pair of end plates (260), one surface of each of the pair of end plates brought into contact with a corresponding one of the upper cover (210) and the lower cover (220), and a pair of cooling fins (270) located respectively at the upper part and the lower part of the plurality of battery cells (230).

Also, in the battery module according to the present invention, the upper cover (210) may include a first horizontal portion (211) located horizontally, a pair of first vertical portions (212) extending downwards from opposite side edges of the first horizontal portion (211), a pair of first receiving recesses (213) formed in each of the first vertical portions (212) so as to be spaced apart from each other by a predetermined distance, and a first cut-out portion (214) formed in one side edge of each of the first vertical portions (212), the first cut-out portion being formed so as to have a predetermined shape by cutting, and the lower cover (220) may include a second horizontal portion (221) located horizontally, a pair of second vertical portions (222) extending upwards from opposite side edges of the second horizontal portion (221), a pair of second receiving recesses (223) formed in each of the second vertical portions (222) so as to be spaced apart from each other by a predetermined distance, and a second cut-out portion (224) formed in one side edge of each of the second vertical portions (222), the second cut-out portion being formed so as to have a predetermined shape by cutting.

Also, in the battery module according to the present invention, each of the upper cover (210) and the lower cover (220) may be made of a steel sheet.

Also, in the battery module according to the present invention, the front busbar assembly (240) may include a first frame (241) having a plurality of slits formed therein, the first frame being configured to have a hexahedral shape, a plurality of third protrusions (242) formed on the outer surface of the first frame (241), the third protrusions being coupled to the first receiving recesses (213) and the second receiving recesses (223), and a plurality of first spacers (244) spaced apart from each other by a predetermined distance, each of the first spacers extending inwards by a predetermined length, and the rear busbar assembly (250) may include a second frame (251) having a plurality of slits formed therein, the second frame being configured to have a hexahedral shape, a plurality of fourth protrusions (252) formed on the outer surface of the second frame (251), the fourth protrusions being coupled to the first receiving recesses (213) and the second receiving recesses (223), and a plurality of second spacers (254) spaced apart from each other by a predetermined distance, each of the second spacers portions extending inwards by a predetermined length.

Also, in the battery module according to the present invention, the two or more unit modules (200) may be electrically connected to each other by an inter-busbar (300), and the two or more unit modules (200) may be maintained spaced apart from each other by the predetermined distance by a distance maintenance portion (400).

Also, in the battery module according to the present invention, the inter-busbar (300) may include a third horizontal portion (310) having a predetermined length, a pair of third vertical portions (320) bent from the edge of the third horizontal portion (310) at a predetermined angle, and a fifth cut-out portion (330) formed between the pair of third vertical portions (320).

Also, in the battery module according to the present invention, the distance maintenance portion (400) may includes a fourth horizontal portion (410) seated in the first cut-out portions (214) of adjacent unit modules (200), a pair of fourth vertical portions (420) extending perpendicularly from opposite side edges of the fourth horizontal portion (410) by a predetermined length, the fourth vertical portions being located inside the covers of the adjacent unit modules (200), and a fifth horizontal portion (430) connected to lower ends of the fourth vertical portions (420), the fifth horizontal portion being seated in the second cut-out portions (224) of the adjacent unit modules (200).

Also, in the battery module according to the present invention, the fifth horizontal portion (430) may be configured to have a "[" shape such that the third horizontal portion (310) of the inter-busbar (300) is received in the fifth horizontal portion.

Also, in the battery module according to the present invention, the two or more unit modules (200) may be spaced apart from each other by 20 mm to 30 mm.

Also, in the battery module according to the present invention, the lower housing (120) may be provided at the inner surface thereof with a support portion (123) configured to maintain the unit modules (200) spaced apart from each other by the predetermined distance.

In addition, a battery pack according to the present invention includes the battery module.

In addition, a device according to the present invention has the battery pack.

Advantageous Effects

A battery module capable of preventing the movement of gas to an adjacent module according to the present invention has an advantage in that a plurality of unit modules is located so as to be spaced apart from each other by a predetermined distance, whereby, even in the case in which an event, such as thermal runaway, occurs in a specific unit module, it is possible to minimize the transfer of heat to a unit module adjacent thereto.

In addition, a battery module capable of preventing the movement of gas to an adjacent module according to the present invention has an advantage in that distance maintenance portions configured to connect a plurality of unit modules to each other are provided, whereby it is possible to securely fix and fasten the unit modules.

Furthermore, a battery module capable of preventing the movement of gas to an adjacent module according to the present invention has an advantage in that a cover of each unit module or a housing configured to wrap unit modules is made of an insulative material or a heat-resistant material, whereby it is possible to improve safety of the unit modules.

BEST MODE

In the present application, it should be understood that the terms "comprises," "has," "includes," etc. specify the presence of stated features, numbers, steps, operations, elements, components, or combinations thereof, but do not preclude the presence or addition of one or more other features, numbers, steps, operations, elements, components, or combinations thereof.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a battery module capable of preventing the movement of gas to an adjacent module according to the present invention will be described with reference to embodiments.

Figure 1:
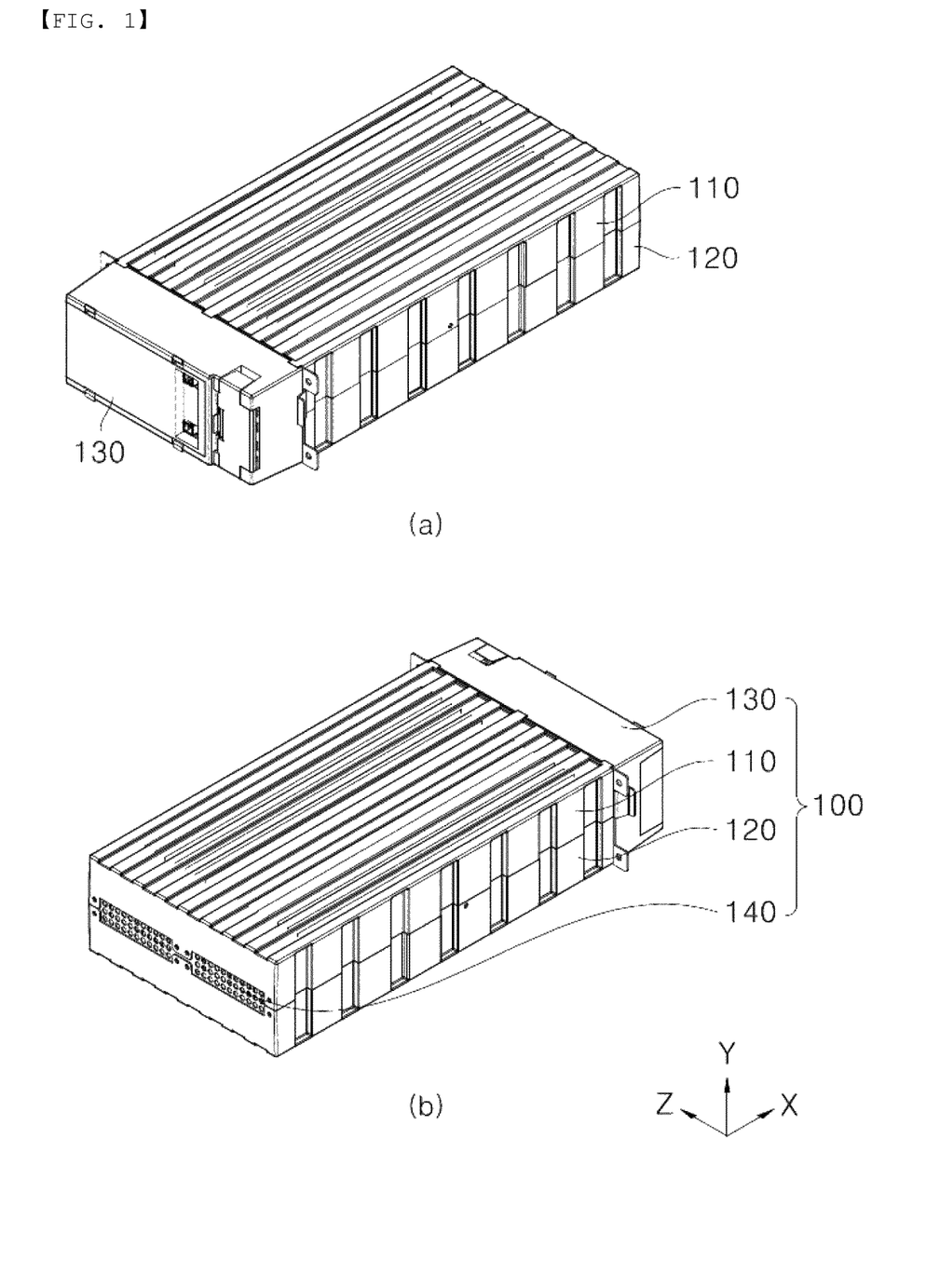
FIGS. 1a and 1b are front and rear perspective views, respectively, of a battery module according to a preferred embodiment of the present invention.
Figure 2:
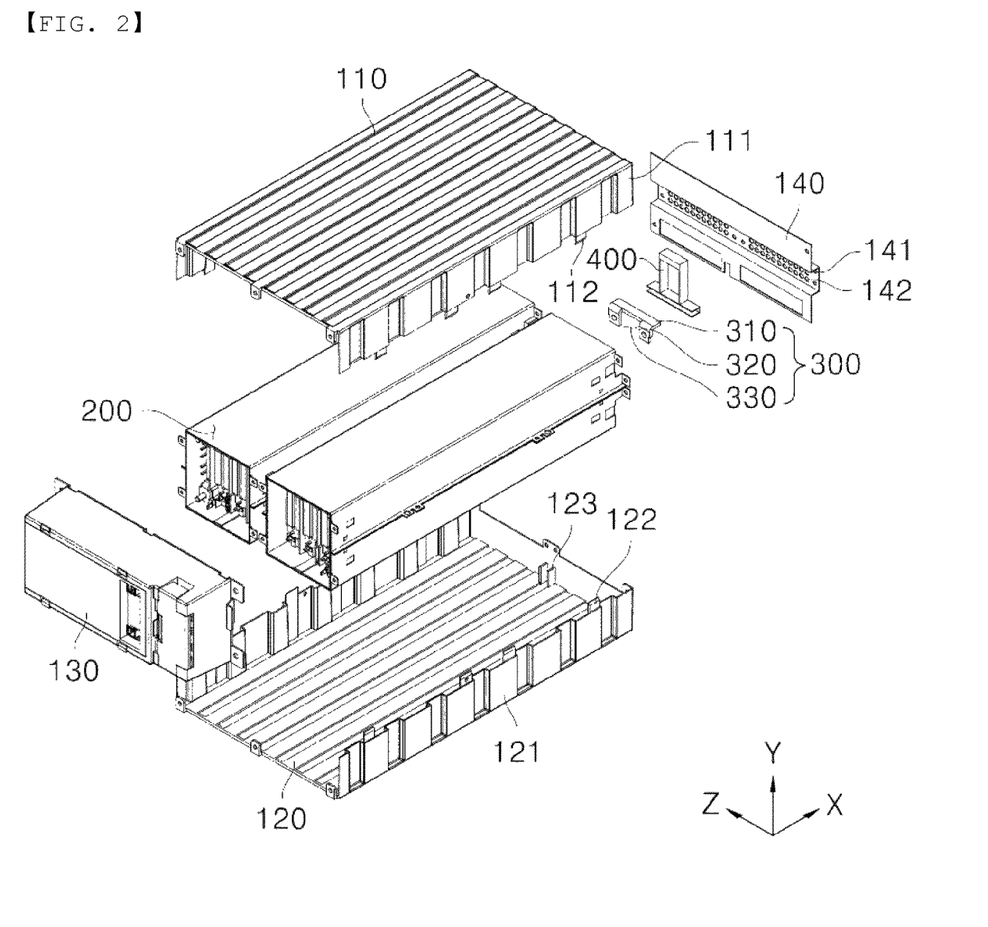
FIG. 2 is an exploded perspective view of the battery module according to the preferred embodiment of the present invention when viewed from the front.

FIGS. 1a and 1b are perspective views of a battery module according to a preferred embodiment of the present invention when viewed from the front and the rear, and FIG. 2 is an exploded perspective view of the battery module according to the preferred embodiment of the present invention when viewed from the front.

Referring to FIGS. 1 and 2, the battery module according to the present invention includes a module case 100, a plurality of unit modules 200, an inter-busbar 300, and a distance maintenance portion 400.

First, the module case 100 will be described in detail. The module case 100, which is configured to wrap the plurality of unit modules 200, includes an upper housing 110, a lower housing 120, a front cover 130, and a rear cover 140.

The upper housing 110 has a "[" shape so as to cover the upper surface and a portion of the side surface of each of the unit modules 200. It is preferable that the upper housing be formed so as to have a concave-convex structure in order to alleviate external impact.

In particular, a concave-convex portion of a first side portion 111 constituting the side surface of the upper housing is provided with a first protrusion 112 projecting downwards by a predetermined length, and a second protrusion 122, a description of which will follow, is received in the concave-convex portion having the first protrusion 112.

The lower housing 120 has an external shape similar to the external shape of the upper housing 110. That is, the lower housing has a "[" shape so as to cover the lower surface and a portion of the side surface of each of the unit modules 200, and is formed so as to have a concave-convex structure in order to alleviate external impact.

In addition, the lower housing is provided at the horizontal inner surface thereof with a pair of support portions 123 spaced apart from each other by a predetermined distance in order to maintain the distance between a pair of unit modules 200 and to prevent the movement of the pair of unit modules in the lower housing when the pair of unit modules is received in the lower housing.

In the figure, the support portions are shown as being provided at only the lower housing 120. Of course, however, it is obvious that the support portions are also provided at the upper housing 110.

A second side portion 121 of the lower housing 120 has a concave-convex structure, and a concave-convex portion of the second side portion is provided with a second protrusion 122 projecting upwards.

A fastening structure when the upper housing 110 and the lower housing 120 are coupled to each other will be described in brief. The first protrusion 112 and the second protrusion 122 are formed so as to deviate from each other to the extent to which the first protrusion and the second protrusion do not join each other. As a result, the first protrusion 112 is inserted into the concave-convex portion having the second protrusion 122 formed thereon, and the second protrusion 122 is inserted into the concave-convex portion having the first protrusion 112 formed thereon, whereby the housings are fastened to each other. Consequently, it is possible to easily couple and fix the housings without a complicated fastening means.

Meanwhile, it is preferable that each of the upper housing 110 and the lower housing 120 be made of an insulative material.

The front cover 130, which is located at the front surface of the battery module, includes a front internal circuit board (ICB), and protects the internal circuit board (ICB) and the unit modules from external physical impact.

The rear cover 140 is located at the rear surface of the battery module, and is provided with a bent portion 141, which is formed so as to project outwards in a lateral direction (X-axis direction) of the battery module. In addition, a plurality of holes 142 configured to allow gas to be discharged therethrough or to allow cooling air to pass therethrough is formed in the bent portion 141.

That is, when thermal runaway occurs in a specific battery cell 230 due to short circuit, thermal impact, or electrical breakdown, gas generated in the battery cell may be rapidly discharged to the outside through the plurality of holes 142. In addition, at ordinary times, external air may be easily introduced into the battery module through the plurality of holes, whereby the battery module is operated at proper temperatures.

Furthermore, the bent portion 141 wraps a first projecting portion 215 of an upper cover 210 and a second projecting portion 225 of a lower cover 220, a description of which will follow, above and below, whereby it is possible to more securely fix the upper cover 210 and the lower cover 220.

Meanwhile, the plurality of unit modules 200 received in the upper and lower housings is located so as to be spaced apart from each other by a predetermined distance, whereby a gas flow channel is formed in the battery module. When an event, such as thermal runaway, occurs, therefore, the movement of gas or the transfer of heat to an adjacent unit module 200 may be minimized, whereby safety of the battery module is improved.

The unit modules 200, each of which includes a plurality of unit cells, the inter-busbar 300 configured to electrically connect the unit modules 200 to each other, and the distance maintenance portion 400 configured to maintain the state in which the unit modules 200 are spaced apart from each other will be described below in detail.

Figure 3:
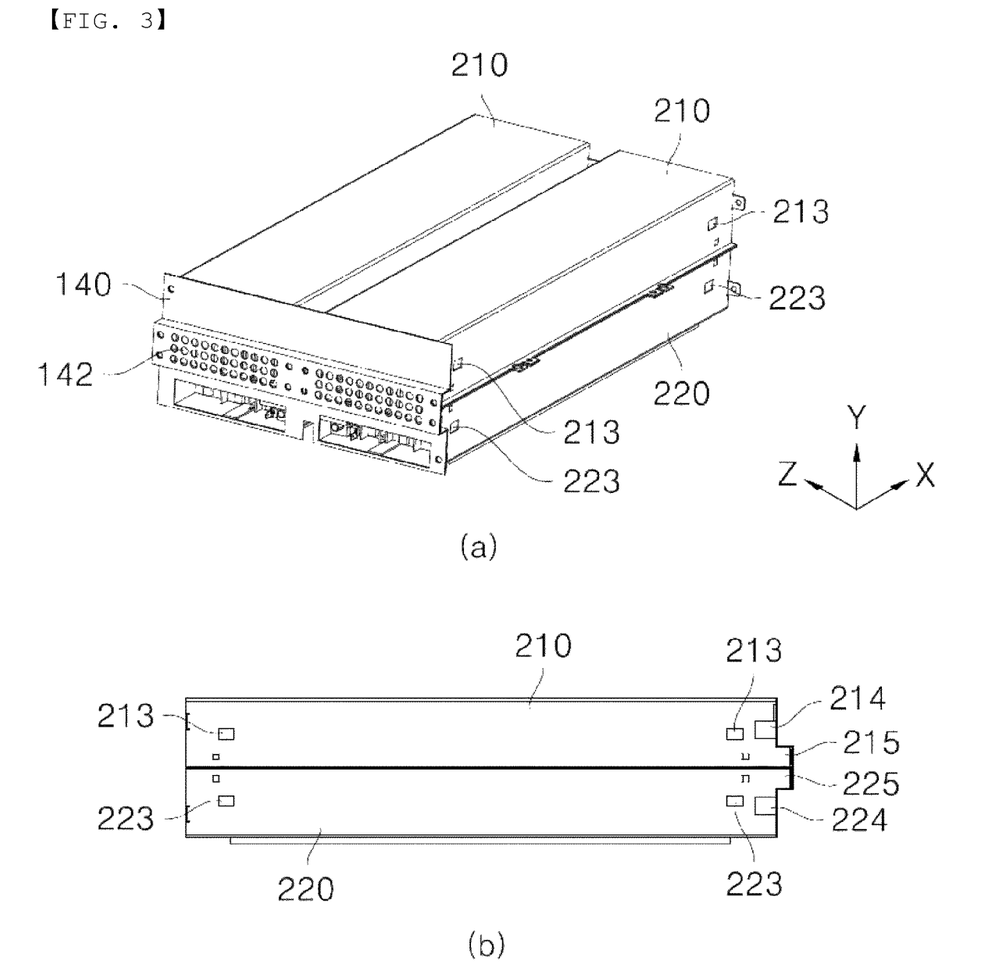
FIGS. 3a and 3b are perspective views of unit modules according to a preferred embodiment of the present invention in the state in which upper and lower housings are separated therefrom when viewed from the rear and a side view thereof
Figure 4:
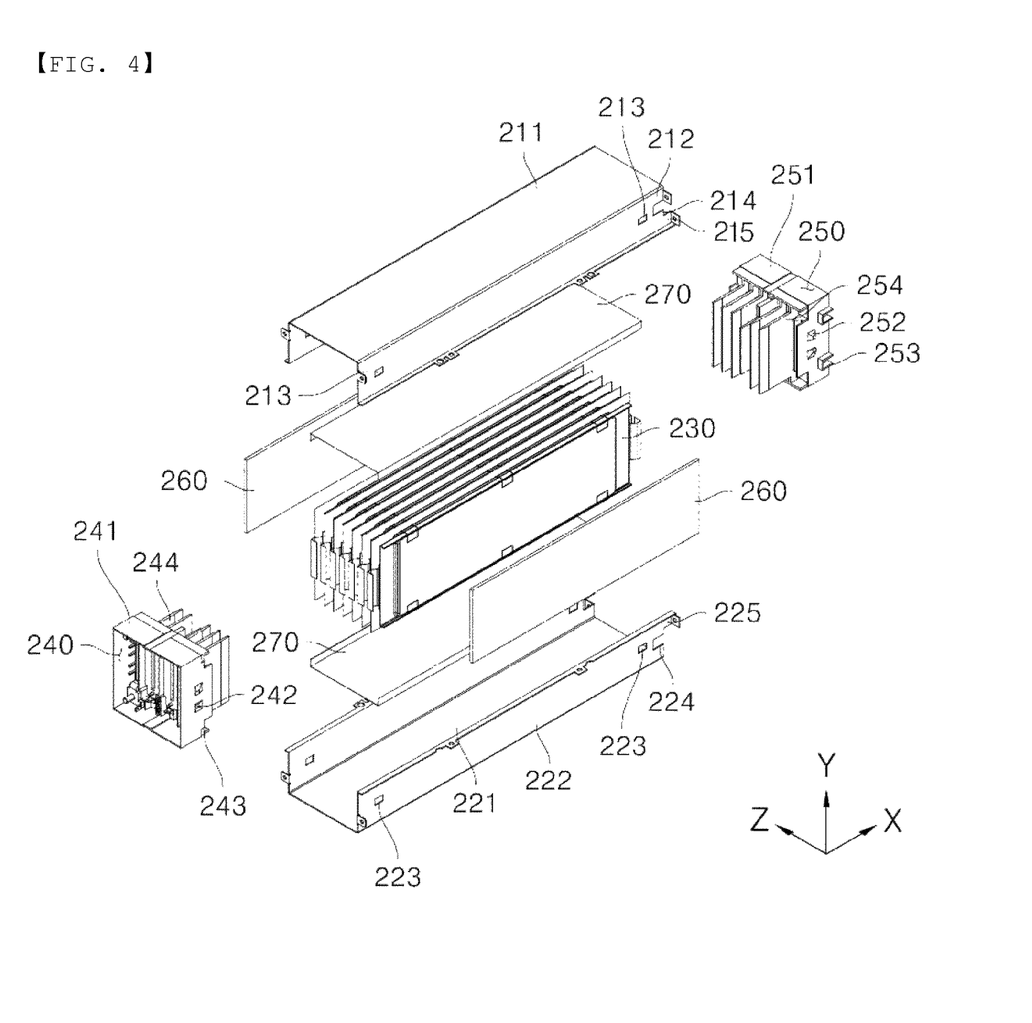
FIG. 4 is an exploded perspective view of the unit module according to the preferred embodiment of the present invention.

FIGS. 3a and 3b are a perspective views of unit modules according to a preferred embodiment of the present invention in the state in which the upper and lower housings are separated therefrom when viewed from the rear and a side view thereof, respectively, and FIG. 4 is an exploded perspective view of the unit module according to the preferred embodiment of the present invention.

The unit module 200 will be described in detail with reference to FIGS. 3 and 4. The unit module 200 includes an upper cover 210, a lower cover 220, battery cells 230, a front busbar assembly 240, a rear busbar assembly 250, end plates 260, and cooling fins 270.

First, the upper cover 210 will be described in detail. The upper cover includes a first horizontal portion 211 located horizontally and a pair of first vertical portions 212 extending downwards from opposite side edges of the first horizontal portion 211.

A pair of predetermined-shaped first receiving recesses 213 is formed in each of the first vertical portions 212 so as to be spaced apart from each other by a predetermined distance. In addition, a predetermined-shaped first cut-out portion 214 is provided in one side edge of each of the first vertical portions 212.

Here, third protrusions 242 of the front busbar assembly 240 and fourth protrusions 252 of the rear busbar assembly 250, a description of which will follow, are fastened to the pair of first receiving recesses 213, respectively.

In addition, a fourth horizontal portion 410 of the distance maintenance portion 400, a description of which will follow, is seated in the first cut-out portion 214.

Meanwhile, a first projecting portion 215 is formed under the first cut-out portion 214 of each of the first vertical portions 212 so as to project outwards by a predetermined length. The first projecting portion is seated in the bent portion 141 of the rear cover 140, as previously described.

Next, the lower cover 220 will be described. The lower cover has a shape corresponding to the shape of the upper cover 210 described above.

That is, the lower cover includes a second horizontal portion 221 located horizontally and a pair of second vertical portions 222 extending upwards from opposite side edges of the second horizontal portion 221. In the same manner as the upper cover, the lower cover is provided with a pair of second receiving recesses 223 spaced apart from each other by a predetermined distance and a second cut-out portion 224.

The third protrusion 242 of the front busbar assembly 240 and the fourth protrusion 252 of the rear busbar assembly 250 are fastened to the pair of second receiving recesses 223, respectively. A fifth horizontal portion 430 of the distance maintenance portion 400 is seated in the second cut-out portion 224.

In addition, a second projecting portion 225 is also formed under the second cut-out portion 224 of each of the second vertical portions 222 so as to project outwards by a predetermined length. The second projecting portion 225 is seated in the bent portion 141 of the rear cover 140.

Here, it is preferable that each of the upper cover 210 and the lower cover 220 be made of a steel sheet, which is incombustible and has a high melting point. The reason for this is that, even in the case in which gas is generated in the unit module and therefore the pressure in the unit module increases, it is possible to inhibit volumetric expansion of the unit module and furthermore to withstand thermal runaway.

Figure 7:
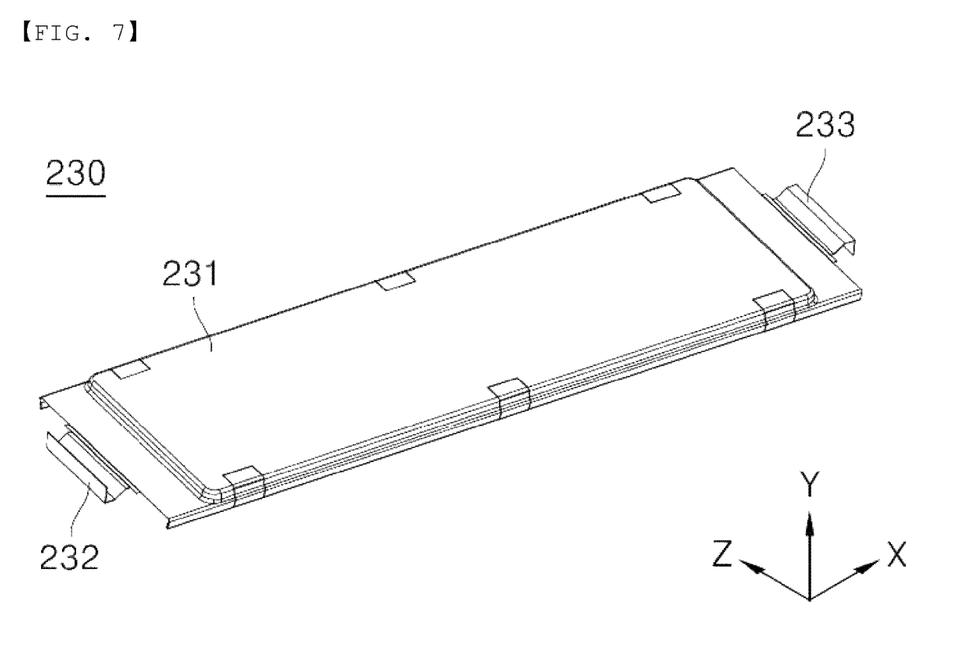
FIG. 7 is a perspective view of a battery cell according to a preferred embodiment of the present invention.

FIG. 7 is a perspective view of a battery cell according to a preferred embodiment of the present invention. The battery cell 230 will be described with reference to FIG. 7. The battery cell 230 includes a cell assembly. The cell assembly may be a jelly-roll type cell assembly, which is configured to have a structure in which a long sheet type positive electrode and a long sheet type negative electrode are wound in the state in which a separator is interposed between the positive electrode and the negative electrode, a stacked type cell assembly including unit cells, each of which is configured to have a structure in which a rectangular positive electrode and a rectangular negative electrode are stacked in the state in which a separator is interposed therebetween, a stacked and folded type cell assembly, which is configured to have a structure in which unit cells are wound using a long separation film, or a laminated and stacked type cell assembly, which is configured to have a structure in which unit cells are stacked in the state in which a separator is interposed therebetween and are then attached to each other. However, the present invention is not limited thereto.

The cell assembly is mounted in a cell case 231. The cell case 231 is generally configured to have a laminate sheet structure including an inner layer, a metal layer, and an outer layer. The inner layer directly contacts the cell assembly, whereby the inner layer must exhibit high insulation properties and high resistance to an electrolytic solution. In addition, the inner layer must exhibit high sealability in order to hermetically seal the cell case from the outside, i.e. a thermally-bonded sealed portion between inner layers must exhibit excellent thermal bonding strength. The inner layer may be made of a material selected from among a polyolefin-based resin, such as polypropylene, polyethylene, polyethylene-acrylic acid, or polybutylene, a polyurethane resin, and a polyimide resin, which exhibit excellent chemical resistance and high sealability. However, the present invention is not limited thereto, and polypropylene, which exhibits excellent mechanical-physical properties, such as tensile strength, rigidity, surface hardness, and resistance to impact strength, and excellent chemical resistance, is the most preferably used.

The metal layer, which abuts the inner layer, corresponds to a barrier layer configured to prevent moisture or various kinds of gas from permeating into the battery from the outside. Aluminum foil, which is light and easily formable, may be used as a preferred material of the metal layer.

The outer layer is provided on the other surface of the metal layer. The outer layer may be made of a heat-resistant polymer that exhibits excellent tensile strength, resistance to moisture permeation, and resistance to air transmission such that the outer layer exhibits high heat resistance and chemical resistance while protecting the cell assembly. As an example, the outer layer may be made of nylon or polyethylene terephthalate. However, the present invention is not limited thereto.

Meanwhile, leads, i.e. a positive electrode lead 232 and a negative electrode lead 233, are exposed out of the case after being electrically connected to a positive electrode tab and a negative electrode tab of the cell assembly, respectively. The battery cell described above corresponds to a generally known construction, and therefore a more detailed description thereof will be omitted.

The front busbar assembly 240, which is configured to electrically connect a plurality of battery cells 230 to each other, will be described with reference back to FIG. 4. The front busbar assembly 240 includes a first frame 241, third protrusions 242, a third cut-out portion 243, and first spacers 244.

The first frame 241 is configured to have a hexahedral shape, and a plurality of slits, through which electrode leads extend, is formed in the first frame. A plurality of third protrusions 242 is formed on the outer surface of the first frame 241. The third protrusions 242 are fastened to the first receiving recesses 213 of the upper cover 210 and the second receiving recesses 223 of the lower cover 220.

The third cut-out portion 243 is located at the lower part of the edge of the front busbar assembly 240, and is a passage, through which an inner connection member extends.

Each of the first spacers 244 is formed in the shape of a sheet projecting by a predetermined length in a direction parallel to the battery cells 230, and the first spacers maintain the battery cells 230 spaced apart from each other by a predetermined distance.

The rear busbar assembly 250 includes a second frame 251, fourth protrusions 252, a fourth cut-out portion 253, and second spacers 254.

The second frame 251 is configured to have a hexahedral shape, and a plurality of slits, through which electrode leads extend, is formed in the second frame. A plurality of fourth protrusions 252 is formed on the outer surface of the second frame 251. The fourth protrusions 252 are fastened to the first receiving recesses 213 of the upper cover 210 and the second receiving recesses 223 of the lower cover 220.

In the same manner as the first spacers 244, the second spacers 254 maintain the battery cells 230 spaced apart from each other by a predetermined distance.

A pair of end plates 260 is located at one-side surfaces of the outermost battery cells 230, specifically side surfaces of a pair of battery cells 230 closest to the upper cover 210 and the lower cover 220.

Each of the end plates 260 may be made of a cushioning material in order to protect the battery cells 230 from external impact.

The cooling fins 270, which are located at the upper surface and the lower surface of the battery cells 230 vertically disposed side by side, absorb heat inevitably generated at the time of charging and discharging the battery cells such that electrical performance of the battery cells is maintained.

Figure 5:
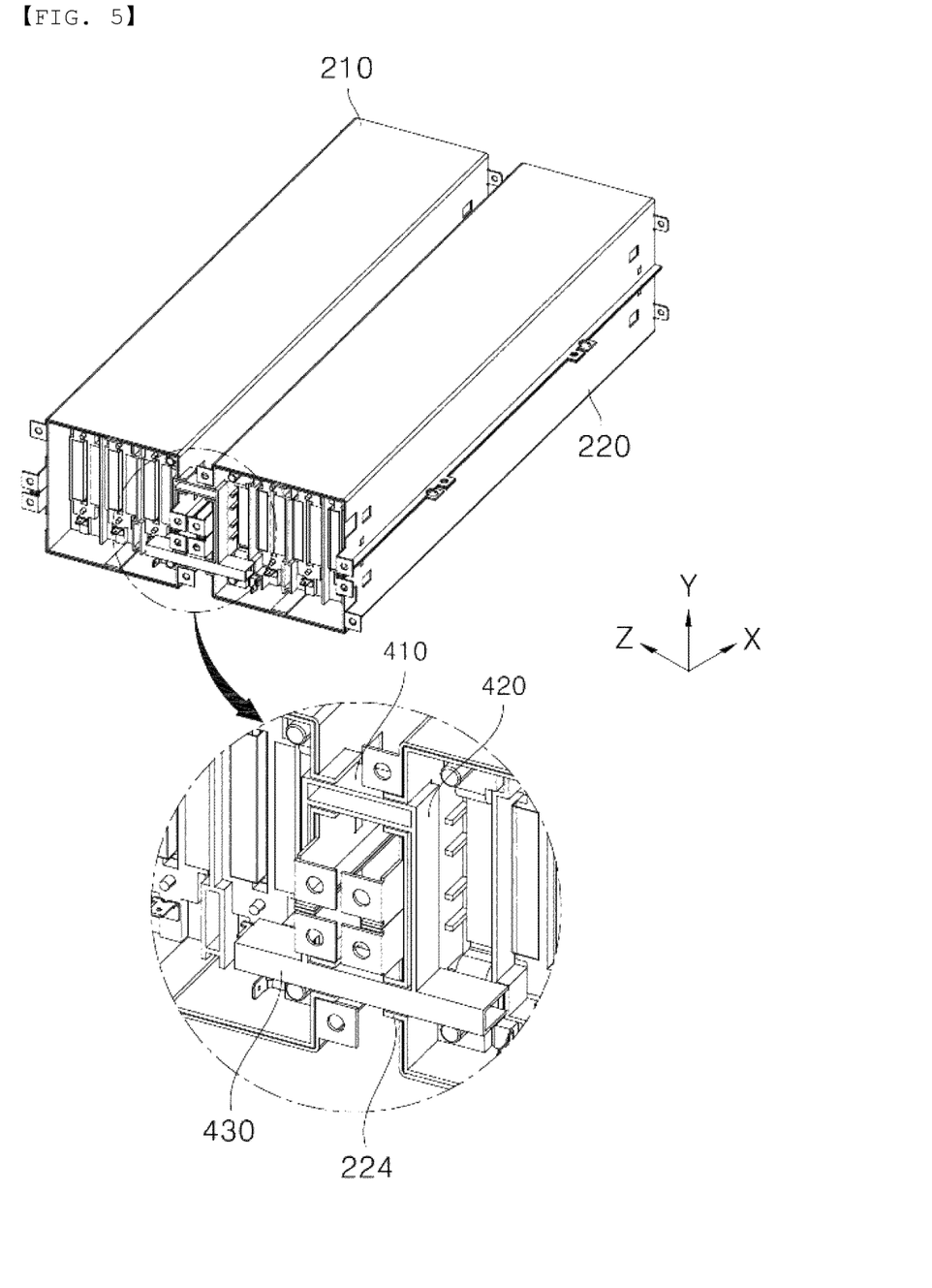
FIG. 5 is an enlarged perspective view of a section at which a distance maintenance portion configured to connect the unit modules according to the preferred embodiment of the present invention to each other is mounted.
Figure 6:
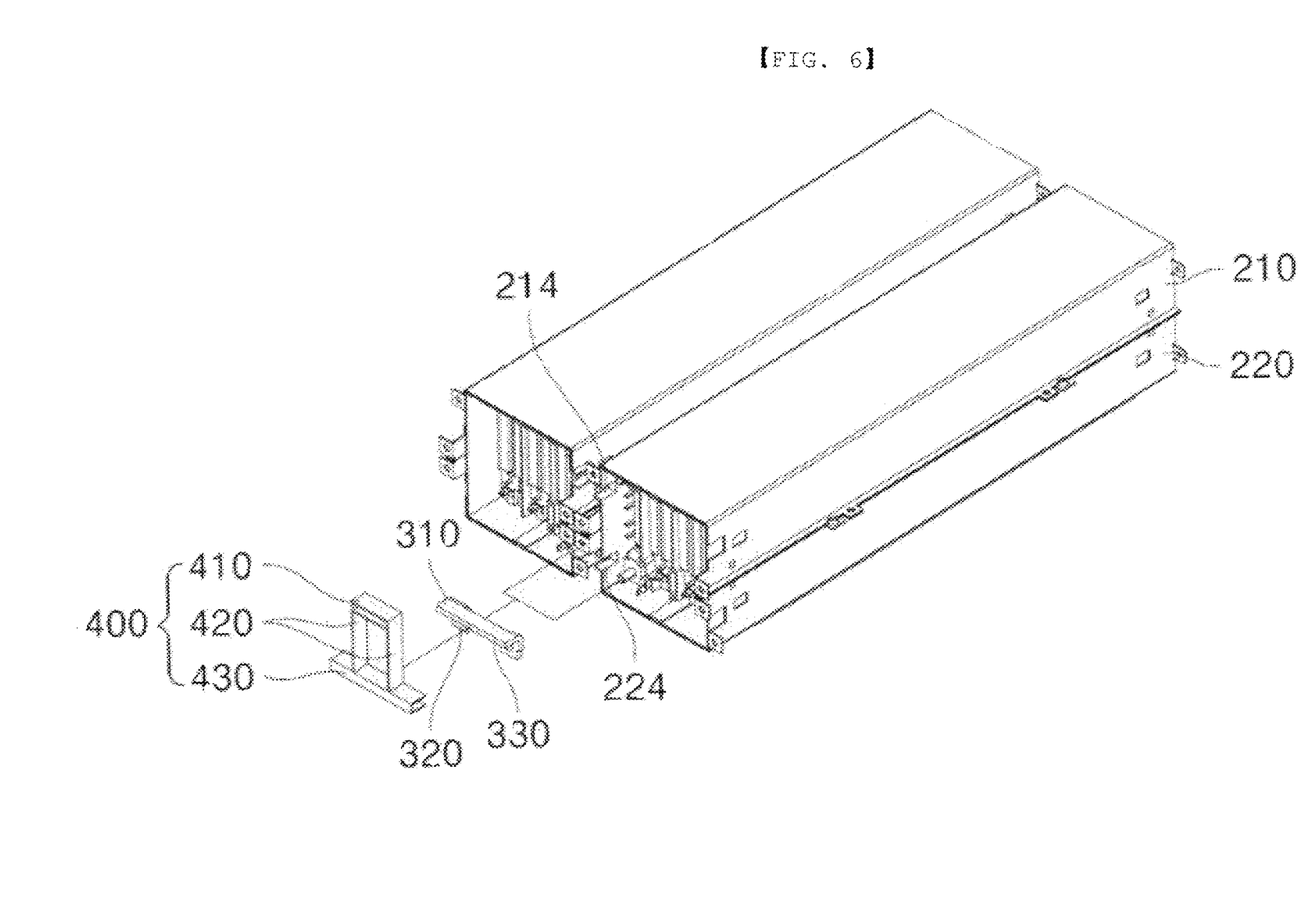
FIG. 6 is an exploded perspective view illustrating a section at which an inter-busbar configured to connect the unit modules according to the preferred embodiment of the present invention to each other is mounted.

FIG. 5 is an enlarged perspective view of a section at which the distance maintenance portion configured to connect the unit modules according to the preferred embodiment of the present invention to each other is mounted, and FIG. 6 is an exploded perspective view illustrating a section at which the inter-busbar configured to connect the unit modules according to the preferred embodiment of the present invention to each other is mounted.

The inter-busbar 300 and the distance maintenance portion 400 will be described in detail with reference to FIGS. 5 and 6. The inter-busbar 300 includes a third horizontal portion 310 having a predetermined length, a pair of third vertical portions 320 bent from the edge of the third horizontal portion 310 at a predetermined angle, and a fifth cut-out portion 330 formed between the pair of third vertical portions 320 so as to have a predetermined shape by cutting.

The third horizontal portion 310 is seated in the second cut-out portion 224 of the lower cover 220 in order to electrically interconnect a pair of unit modules 200 located adjacent to each other. The pair of third vertical portions 320 is connected to ends of the unit modules 200.

The distance maintenance portion 400 includes a fourth horizontal portion 410, a pair of fourth vertical portions 420, and a fifth horizontal portion 430.

The fourth horizontal portion 410 is seated in the first cut-out portions 214 of adjacent unit modules 200 to maximally prevent the movement of gas between the unit modules 200. The pair of fourth vertical portions 420 extends perpendicularly from opposite side edges of the fourth horizontal portion 410 by a predetermined length, and is located inside the covers of the adjacent unit modules 200. In addition, the fifth horizontal portion 430 is connected to the lower ends of the fourth vertical portions 420, and is seated in the second cut-out portions 224 of the adjacent unit modules 200.

Here, it is preferable that the fifth horizontal portion 430 have a "[" shape such that the interior of the fifth horizontal portion is hollow. The reason for this is that it is necessary to insulate the rear cover 140, the upper cover 210, and the lower cover 220 from each other and at the same time to wrap the outer surface of the third horizontal portion 310 of the inter-busbar 300 in order to protect the third horizontal portion from various kinds of foreign matter introduced from the outside.

As the result of the inter-busbar 300 and the distance maintenance portion 400, configured as described above, being inserted into and seated in the fourth cut-out portion 253 of the rear busbar assembly 250, it is possible to electrically connect the adjacent unit modules 200 to each other and to inhibit an increase in volume of the battery module, since the inter-busbar and the distance maintenance portion do not project to the outside. In addition, it is possible to uniformly maintain the distance between the unit modules 200 and to control the movement of the unit modules in upward, downward, leftward, and rightward directions.

Figure 8:
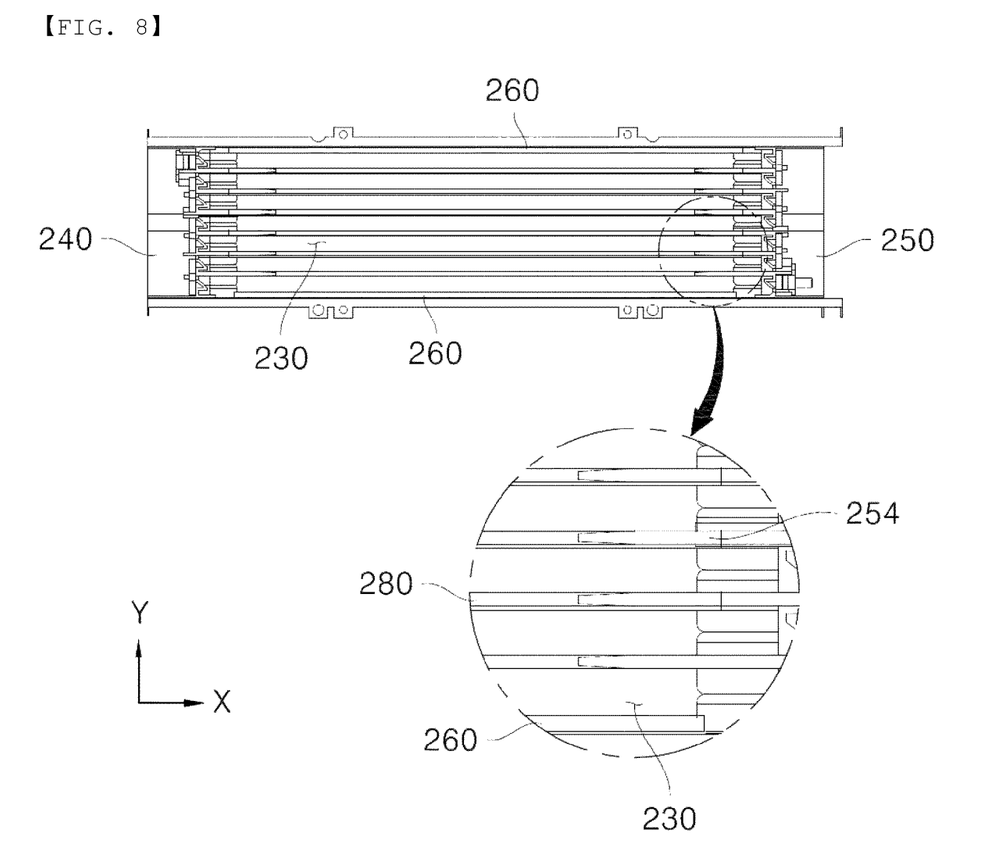
FIG. 8 is a horizontal sectional view of the unit module according to the preferred embodiment of the present invention.
Figure 9:
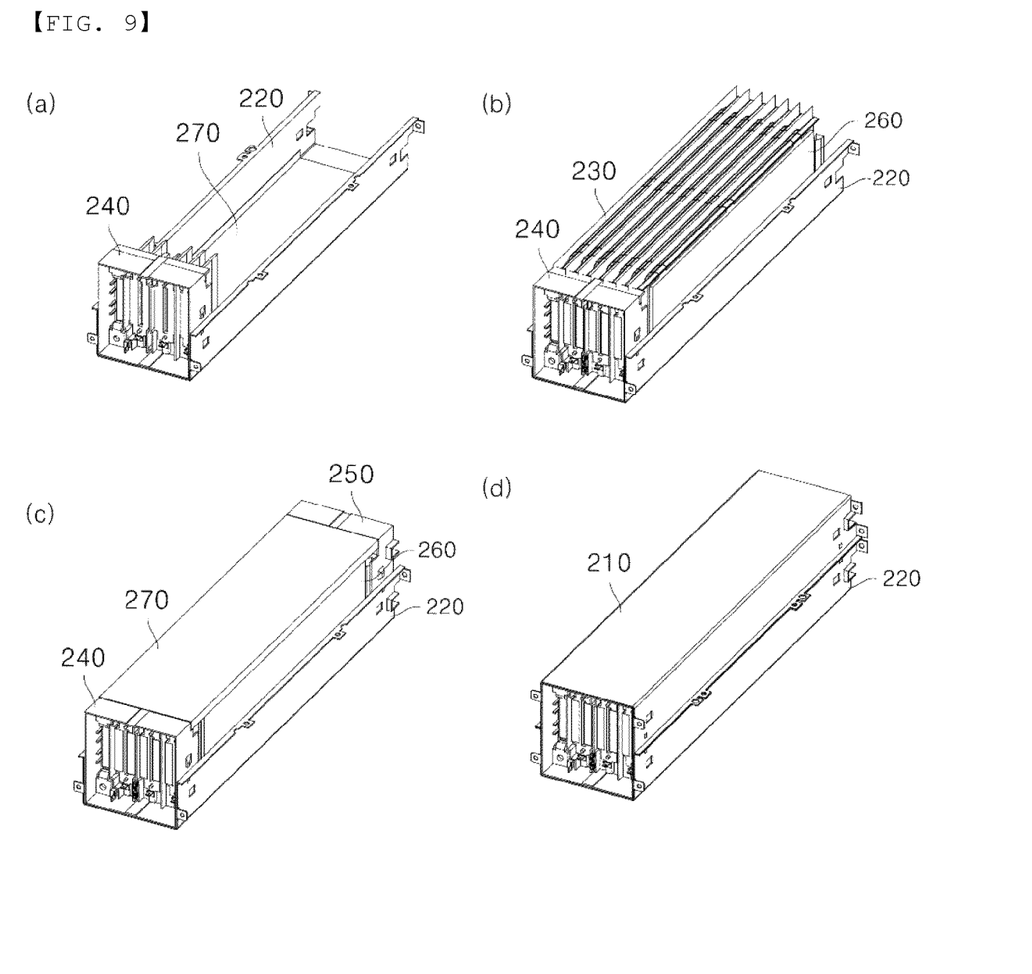
FIGS. 9a-9d are views illustrating a sequence of assembling the unit module according to the preferred embodiment of the present invention.

FIG. 8 is a horizontal sectional view of the unit module according to the preferred embodiment of the present invention.

Air layers formed by the spacers will be described with reference to FIG. 8. As previously described, the front busbar assembly 240 having the first spacers 244 and the rear busbar assembly 250 having the second spacers 254 are located at the front surface and the rear surface of the battery cells 230, respectively. Consequently, air layers 280, each of which has a predetermined length (X axis), are formed between the battery cells 230 by the first spacers 244 and the second spacers 254.

The air layers 280 prevent heat generated by a specific battery cell 230 from moving to battery cells 230 adjacent thereto, whereby it is possible to alleviate a thermal runaway phenomenon of the unit module 200. Furthermore, the air layers may simultaneously perform a shock absorption function at the time of swelling of the battery cells 230.

FIGS. 9a-d are views illustrating a sequence of assembling the unit module according to the preferred embodiment of the present invention.

Referring to FIGS. 9a-d, the unit module is assembled through a first step of locating the cooling fin 270 at the inner surface of the lower cover 220 in a horizontal direction and fastening the third protrusion 242 of the front busbar assembly 240 to the second receiving recess 223 of the lower cover 220, a second step of seating the plurality of battery cells 230 and the end plates 260 so as to correspond to the first spacers 244 of the front busbar assembly 240, a third step of locating the cooling fin 270 at the upper part of the plurality of battery cells 230 and fastening the fourth protrusion 252 of the rear busbar assembly 250 to the second receiving recess 223 of the lower cover 220, and a fourth step of fastening the third protrusion 242 of the front busbar assembly 240 and the fourth protrusion 252 of the rear busbar assembly 250 to the first receiving recesses 213 of the upper cover 210.

Meanwhile, the assembly sequence may be changed. For example, in the first step, fastening of the front busbar assembly 240 and seating of the cooling fin 270 may be simultaneously performed.

Also, in the first step, the rear busbar assembly 250 may be assembled first instead of the front busbar assembly 240. In this case, it is obvious that, in the third step, the front busbar assembly 240 is seated instead of the rear busbar assembly 250.

A plurality of battery modules according to the present invention may constitute a battery pack. The battery pack may be mounted in a device. Concrete examples of the device may include a vehicle, a mobile phone, and a laptop computer. However, a device having relatively low capacity and voltage, like the laptop computer, is more preferable.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and the technical idea of the present invention, and it will be obvious that such changes and modifications fall within the scope of the appended claims.

DESCRIPTION OF REFERENCE NUMERALS

- 100: Module case
- 110: Upper housing
- 111: First side portion
- 112: First protrusion
- 120: Lower housing
- 121: Second side portion
- 122: Second protrusion
- 123: Support portions
- 130: Front cover
- 140: Rear cover
- 141: Bent portion
- 142: Holes
- 200: Unit modules
- 210: Upper cover
- 211: First horizontal portion
- 212: First vertical portions
- 213: First receiving recesses
- 214: First cut-out portion
- 215: First projecting portion
- 220: Lower cover
- 221: Second horizontal portion
- 222: Second vertical portions
- 223: Second receiving recesses
- 224: Second cut-out portion
- 225: Second projecting portion
- 230: Battery cells
- 231: Cell case
- 232: Positive electrode lead
- 233: Negative electrode lead
- 240: Front busbar assembly
- 241: First frame
- 242: Third protrusions
- 243: Third cut-out portion
- 244: First spacers
- 250: Rear busbar assembly
- 251: Second frame
- 252: Fourth protrusions
- 253: Fourth cut-out portion
- 254: Second spacers
- 260: End plates
- 270: Cooling fins
- 280: Air layers
- 300: Inter-busbar
- 310: Third horizontal portion
- 320: Third vertical portions
- 330: Fifth cut-out portion
- 400: distance maintenance portion
- 410: Fourth horizontal portion
- 420: Fourth vertical portions
- 430: Fifth horizontal portion

The invention claimed is:

1. A battery module comprising: a module case; and a plurality of unit modules, wherein the module case is made of an insulative material, wherein two or more unit modules of the plurality of unit modules are received in the module case, wherein the two or more unit modules are located spaced apart from each other, wherein each of the plurality of unit modules comprises stacked battery cells, wherein the two or more unit modules are electrically connected to each other by an inter-busbar, wherein the two or more unit modules are maintained spaced apart from each other by a first distance maintenance portion spaced above a bottom of the two or more unit modules and extending to connect the two or more unit modules, and wherein the first distance maintenance portion fits within at least one groove in each of the two or more unit modules.

2. The battery module according to claim 1, wherein the module case comprises an upper housing, a lower housing, a front cover, and a rear cover.

3. The battery module according to claim 2, wherein the rear cover is provided with a bent portion formed so as to project outwards, and wherein a plurality of holes is formed in the bent portion.

4. The battery module according to claim 1, wherein each of the plurality of unit modules comprises an upper cover, a lower cover, a front busbar assembly, a rear busbar assembly, a pair of end plates, one surface of each of the pair of end plates brought into contact with a corresponding one of the upper cover and the lower cover, and a pair of cooling fins located respectively at an upper part and a lower part of the battery cells.

5. The battery module according to claim 4, wherein the upper cover comprises a first horizontal portion, a pair of first vertical portions extending downwards from opposite side edges of the first horizontal portion, first receiving recesses formed in each of the first vertical portions so as to be spaced apart from each other, and a first cut-out portion formed in one side edge of each of the first vertical portions, and wherein the lower cover comprises a second horizontal portion, a pair of second vertical portions extending upwards from opposite side edges of the second horizontal portion, second receiving recesses formed in each of the second vertical portions so as to be spaced apart from each other, and a second cut-out portion formed in one side edge of each of the second vertical portions.

6. The battery module according to claim 5, wherein each of the upper cover and the lower cover is made of a steel sheet.

7. The battery module according to claim 5, wherein the front busbar assembly comprises a first frame having a first plurality of slits formed therein, a plurality of third protrusions formed on an outer surface of the first frame, the third protrusions being coupled to the first receiving recesses and the second receiving recesses, and a plurality of second distance maintenance portions spaced apart from each other, each of the second distance maintenance portions extending inwards, and wherein the rear busbar assembly comprises a second frame having a second plurality of slits formed therein, a plurality of fourth protrusions formed on an outer surface of the second frame, the fourth protrusions being coupled to the first receiving recesses and the second receiving recesses, and a plurality of third distance maintenance portions spaced apart from each other, each of the third distance maintenance portions extending inwards.

8. The battery module according to claim 1, wherein the inter-busbar comprises a third horizontal portion, a pair of third vertical portions bent from an edge of the third horizontal portion at a predetermined angle, and a fifth cut-out portion formed between the pair of third vertical portions.

9. The battery module according to claim 8, wherein the first distance maintenance portion comprises a fourth horizontal portion seated in the first cut-out portions of adjacent unit modules, a pair of fourth vertical portions extending perpendicularly from opposite side edges of the fourth horizontal portion, the fourth vertical portions being located inside the rear covers of the adjacent unit modules, and a fifth horizontal portion connected to lower ends of the fourth vertical portions, the fifth horizontal portion being seated in the second cut-out portions of the adjacent unit modules.

10. The battery module according to claim 9, wherein the fifth horizontal portion is configured to have a "[" shape such that the third horizontal portion of the inter-busbar is received in the fifth horizontal portion.

11. The battery module according to claim 1, wherein the two or more unit modules are spaced apart from each other by 20 mm to 30 mm.

12. The battery module according to claim 2, wherein the lower housing is provided at an inner surface thereof with a support portion configured to maintain the unit modules spaced apart from each other.

13. A battery pack comprising the battery module according to claim 1.

14. A device having the battery pack according to claim 13.

15. The battery module according to claim 5, wherein the first distance maintenance portion has two horizontal sections, each of the two horizontal sections fitting within grooves in the two or more unit modules.

* * * * *